United States Patent
Munsell et al.

(10) Patent No.: US 10,827,759 B2
(45) Date of Patent: Nov. 10, 2020

(54) RAT REPELLENT SYSTEM AND METHOD

(71) Applicant: STICK-IN-THE-MUD LLC, Chula Vista, CA (US)

(72) Inventors: Clyde Stephan Munsell, Chula Vista, CA (US); James Dalgleish Reid, San Diego, CA (US); Richard William Hanawalt, Ventura, CA (US)

(73) Assignee: STICK-IN-THE-MUD, LLC, Chula Vista, CA (US)

( * ) Notice: Subject to any disclaimer, the term of this patent is extended or adjusted under 35 U.S.C. 154(b) by 175 days.

(21) Appl. No.: 15/680,147

(22) Filed: Aug. 17, 2017

(65) Prior Publication Data

US 2018/0228168 A1 Aug. 16, 2018

Related U.S. Application Data

(63) Continuation-in-part of application No. 14/510,972, filed on Oct. 9, 2014, now Pat. No. 9,763,438.

(51) Int. Cl.
*A61K 36/534* (2006.01)
*A61K 36/889* (2006.01)
*A01N 65/22* (2009.01)
*A01M 29/12* (2011.01)
*A01N 31/06* (2006.01)
*A01N 25/34* (2006.01)

(52) U.S. Cl.
CPC ............ *A01N 65/22* (2013.01); *A01M 29/12* (2013.01); *A01N 31/06* (2013.01); *A01N 25/34* (2013.01)

(58) Field of Classification Search
None
See application file for complete search history.

(56) References Cited

U.S. PATENT DOCUMENTS

| | | |
|---|---|---|
| 3,791,346 A | 2/1974 | Willinger et al. |
| 4,157,696 A | 6/1979 | Carlberg |
| 4,735,803 A | 4/1988 | Katz et al. |
| 4,775,532 A | 10/1988 | Clayton |
| 4,940,583 A | 7/1990 | Thompson |
| 5,242,111 A | 9/1993 | Nakoneczny et al. |
| 5,344,649 A | 9/1994 | Mungia |
| 5,372,429 A | 12/1994 | Beaver, Jr. et al. |
| 5,571,522 A | 11/1996 | Munson et al. |
| 5,674,496 A | 10/1997 | Etscorn et al. |
| 5,714,445 A | 2/1998 | Trinh et al. |
| 5,798,385 A | 8/1998 | Marin |

OTHER PUBLICATIONS

Kalandakanond-Thongsong, et al. (2010) Thai J. Vet. Med. 40(4): 411-418. (Year: 2010).*
Raskin et al. (2004) Current Pharmaceutical Design 10: 3419-3429. (Year: 2004).*
Website document entitled: Murphy's Mosquito Sticks (available at http://www.murphysnaturals.net/murphysmosquitosticks). Downloaded from website Jan. 8, 2016. (Year: 2013).*
Website document entitled "How to use peppermint to repel mice" (available at http://www.ehow.com/how-8330912-use-peppermint-repel-mice.html). Downloaded Jan. 7, 2016 (Year: 2016).*
Website document entitled: "Amazon.com: Murphy's Mosquito Sticks" (available at http://www.amazon.com/Murphys-Mosquito-Sticks-Citronella-Lemongrass . . . ). Downloaded from web Jan. 7, 2016. The reviews indicate that the product was commercially available prior to the filed of the invention. (Year: 2016).*

* cited by examiner

*Primary Examiner* — Russell G Fiebig
(74) *Attorney, Agent, or Firm* — US IP Attorneys, P.C.; Timothy Marc Shropshire

(57) ABSTRACT

The rat repellent system includes a structural member saturated with a menthol solution. The structural member is a fibrous member, such that saturation may be accomplished by submerging the structural member into the menthol solution to allow the structural member to absorb the menthol solution. To maximize saturation, the submerged structural member may be pressurized. The structural member is configured to releasably couple to a substrate, such as a wall stud, a floor joist, a structural beam, or a shipping pallet. The structural member couples to the substrate using a fastener, such as a nail, a screw, or a bolt that passes through an aperture in the structural member and into the substrate. The structural member may also be coupled to a substrate using a clamp.

9 Claims, 2 Drawing Sheets

RAT REPELLENT SYSTEM AND METHOD

CROSS-REFERENCE TO RELATED APPLICATION(S)

The present application claims priority to U.S. Non-Provisional patent application Ser. No. 14/510,972 filed on Oct. 9, 2014, entitled "Pest Post Rat Repellent System" the entire disclosure of which is incorporated by reference herein.

BACKGROUND OF THE INVENTION

1. Field of Invention

The present invention relates generally to rat repellent systems and more specifically it relates to a method for impregnating a fibrous material with an effective amount of rat repellent substance.

2. Description of Related Art

Rats are a common problem in open areas. Rats destroy foliage, carry diseases harmful to both humans and pets, and often infiltrate tractors, trucks, recreational vehicles, boats, implements, and buildings. Rats can cause significant damage to foliage of all kind, vehicles, irrigation lines, and present a risk of disease to humans and animals.

Rat control systems have been in use for years. Outdoor systems typically require a power source to be effective, such as sonic or heat activated systems. Other common products utilized to control rats are poisonous products such as D-Con. However, poison can be harmful to children if swallowed or touched. In addition, the rats often die in the area such as an attic or wall causing an undesirable odor and health hazard if they are eaten by a pet. Otherwise they must be disposed of safely.

Current state of the art is defined by the kill or fatal devices used to treat a rat infestation after the infestation has occurred. An overwhelming history of attempts to solve unwanted rat presence revolve around structural devices used to capture or kill existing rats within an area. Such devices are limited in their capability to target multiple rats as after being triggered by a single rat they are rendered useless to continue controlling rats.

Poisons may be used to address a rat infestation. Specifically, chemical compositions such as ricin are deployed in positions around a structure with the intended outcome of attracting rats through certain scents to induce consumption of the poison. However, such chemical systems have such a broad effective range that they also induce or allow for unintended wild and domesticated animals to consume the poison. Further, the poison requires placement in an open area, which would also be accessible by children resulting in injury or death.

Where poisons are used, there is also a negative effect on the surrounding environment. From the manufacturing of the poison, prior to its implementation, to the disposal of the same, the poisons are often mishandled or not disposed of properly. Such misuse or incorrect disposal can result in a broader distribution of the poisons into surrounding areas, resulting in the potential contact with a larger population of people or animals.

Other illustrative examples of rat related devices and system include U.S. Pat. No. 4,735,803 to Katz et al; U.S. Pat. No. 4,775,532 to Clayton; U.S. Pat. No. 5,372,429 to Beaver, Jr. et al; U.S. Pat. No. 4,940,583 to Thompson; U.S. Pat. No. 5,714,445 to Trinh et al; U.S. Pat. No. 5,674,496 to Etscorn et al; U.S. Pat. No. 5,571,522 to Munson et al; U.S. Pat. No. 5,344,649 to Mungia; U.S. Pat. No. 5,242,111 to Nakoneczny et al; U.S. Pat. No. 4,157,696 to Carlberg; U.S. Pat. No. 3,791,346 to Willinger et al; U.S. Pat. No. 5,798,385 to Marin which are all illustrative of such prior art.

While these devices may be suitable for the particular purpose to which they address, they are not as suitable for repelling rats from open areas or without the need for a power source.

In these respects, the rat repellant system according to the present invention substantially departs from the conventional concepts and designs of the prior art, and in so doing provides an apparatus primarily developed for the purpose of repelling rats from an open area while simultaneously providing a pleasant scent. Another object is to provide a rat repellent system that has an EPA minimum risk classification to humans.

Based on the foregoing, there is a need for a system that repels rats while simultaneously preventing the need for harmful poisons or dangerous artificial conditions caused by current chemical vehicles and structural traps.

SUMMARY OF THE INVENTION

A rat repellent system comprises a prepared solution comprising at least a solvent and an effective amount of crystal menthol. A structural member is saturated with the prepared solution. A substrate receives the structural member.

In an embodiment, the prepared solution further comprises an effective amount of mint, wherein the prepared solution is prepared using a method comprising the steps of: combining the effective amount of crystal menthol in the solvent, wherein the solution is prepared at a temperature at least 85 degrees Fahrenheit.

In an embodiment, the structural member becomes saturated through a method comprising the steps of: submerging the structural member into the prepared solution for a length of time, wherein the structural member absorbs the prepared solution, wherein absorption of the solution is indicated through gasses leaving the structural member.

In an embodiment, the method further comprises the steps of applying a pressure to a container, wherein the structural member is submerged within the prepared solution in the container, wherein the pressure is configured to expand one or more fibers within the structural member.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
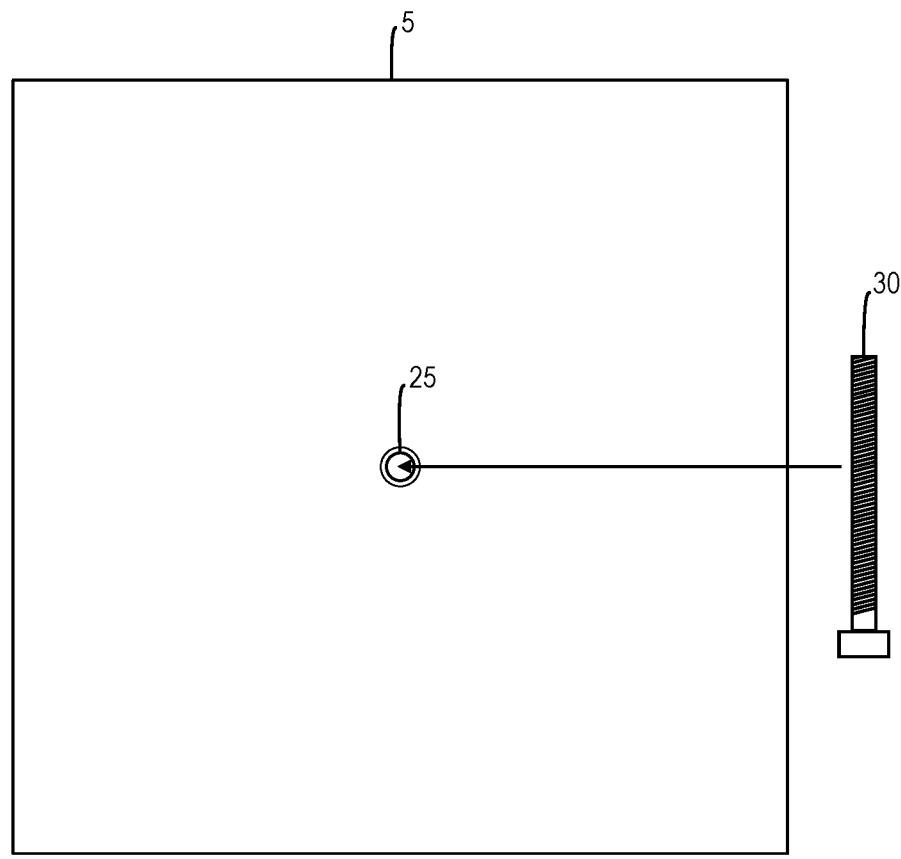
FIG. 1 is a top plan view of the system, according to an embodiment of the present invention.
Figure 2:
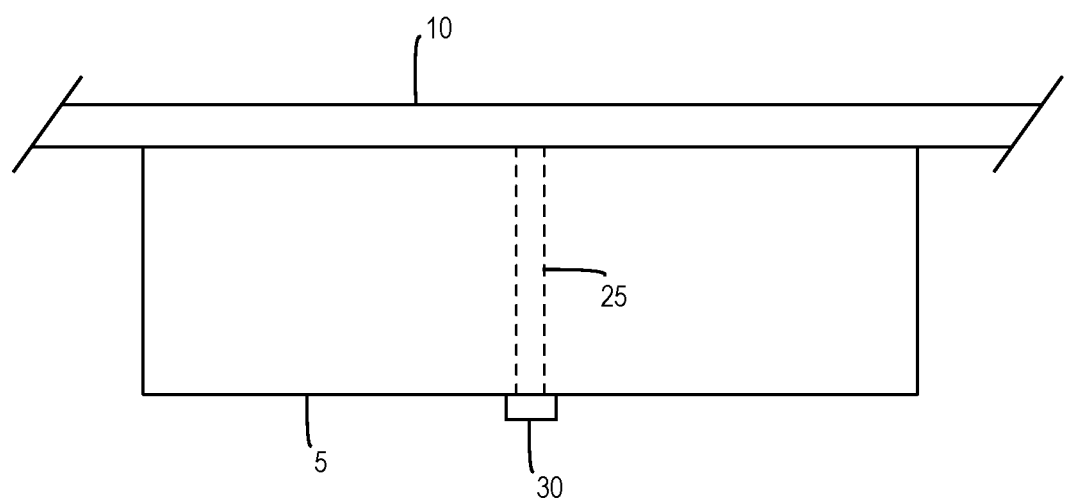
FIG. 2 is a side elevation view of the system, according to an embodiment of the present invention.
Figure 3:
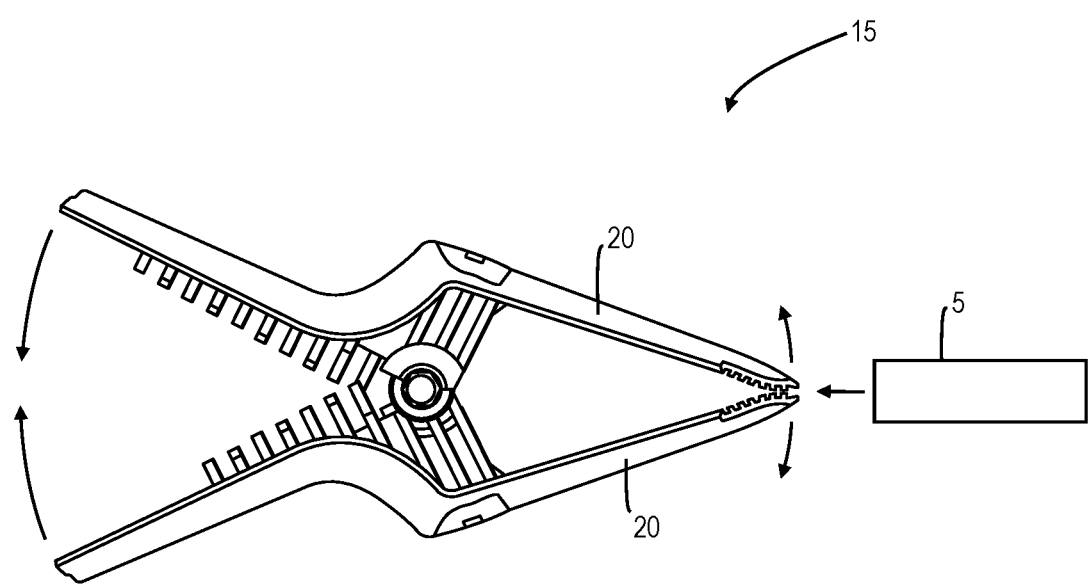
FIG. 3 is a side elevation of the clamp used with the system, according to an embodiment of the present invention.

Preferred embodiments of the present invention and their advantages may be understood by referring to FIGS. 1-3, wherein like reference numerals refer to like elements.

A rat repellent system and method involves a method of impregnating a fibrous material with an effective amount of a rat repellent substance.

In an embodiment, an effective amount of rat repellent substance is a predetermined concentration of menthol in a homogenous solution with a non-polar solvent. A specific example of the solvent would include coconut oil as a Medium Chain Triglyceride or MCT into which crystallized menthol is dissolved.

Rats have an extremely sensitive olfactory system. The rat olfactory system is susceptible to shock or extreme stimulus from contact with menthol evaporate from the rat repellent solution. The rat repellent solution within an impregnated structural member 5 contacts the surrounding environment. Ambient temperatures above 32 degrees Fahrenheit result in a distribution of the menthol from the rat repellent solution into the surrounding environment. In a specific illustrative embodiment, the menthol is atomized and distributed across a surrounding area of the structural member 5 such that the atomized menthol is inhaled by one or more rats within the area in which the structure is distributed.

In an embodiment, the structural member 5 is a fibrous material capable of becoming impregnated and absorbing the rat repellent solution through one or more methods explained herein. For example, the fibrous material may be a wood fiber product or a textile.

In some embodiments, the present system comprises a wood fiber product stake pressure soaked with menthol solution. The stake is composed of Medium Density Fiberboard (MDF) and wedge shaped, approximately 8 inches long, ¾ inch wide and tapered from 2 inches across on one end to a point on the other end. During manufacture the stake is pressure soaked in a solution of Menthol, peppermint oil, and fractionated coconut oil (MCT). The coconut oil is the solvent and carrier of the menthol fragrance when used by the consumer. A package stores one or more of the stakes within a sealable plastic bag. A sealable plastic bag is preferred as the use of fractionated coconut oil may lead to leeching of the solution from the fibrous materials.

In use, the user removes a stake from the package and drives the stake into the ground in the area to be cleared of rats, leaving sufficient surface area exposed to the air to allow for the oil to evaporate into the surrounding atmosphere over time. The fragrance oil is contained in the stake and slowly released through the air. The fragrance oil provides a strong scent that repels rats by irritating their olfactory system while simultaneously providing a pleasant scent to humans. After the scent is weakened over time, the user simply removes the old stake and replaces it with a new one.

In an embodiment, propylene glycol can be used as a solvent in place of the fractionated coconut oil. The use of propylene glycol prevents the solution from leeching out of the fibrous material from which it has been impregnated. This would be especially beneficial in which human contact would be made with the fibrous material, for example when used in the construction of or application to patio furniture or equipment. Additionally, propylene glycol is an approved food additive for dogs under the category of animal feed and is generally recognized as safe for dogs.

The scope of the present invention further comprises the use of medium and long chain triglycerides, as well as ethyl esters as the solvent in place of fractionated coconut oil or propylene glycol.

Method of Impregnation

In some embodiments, the structural member 5 undergoes a process of impregnation to be manipulated such that the structural member 5 becomes impregnated or saturated with the repellent solution.

In some embodiments, the structural member 5 comprises material that readily absorbs an amount of the rat repellent solution. The absorption of the rat repellent solution is generally related to the composition of the material. For example, a sponge-type material, or cotton-based textile may readily uptake a volume of the rat repellent solution until saturation.

In some embodiments, the structural member 5 is fibrous, such as wood fiber. Wood fiber is generally understood to uptake liquids through natural biologic processes. Xylem and phloem traditionally facilitate the distribution of fluids throughout the wood while the plant, from which the wood is extracted, is alive. After the wood has been processed, the fibrous structure exists without the active mechanism of xylem mediated fluid uptake. In such an embodiment of wood fiber as the structural member 5, a number of steps are involved in the forced uptake and saturation of the structural member 5.

A first step involves preparation of the menthol solution. As discussed above, the solution may comprise at least coconut oil and an effective amount of menthol and peppermint oil. The effective amount of menthol is a volume by weight of crystallized menthol to coconut oil to result in a specific amount of menthol be contained by each structure adequate to the desired olfactory purpose.

In an embodiment, solvents may be substituted for the coconut oil. Any solvent deemed environmentally safe and capable of dissolving crystal menthol may be used separately or in combination with the coconut oil.

In an embodiment, menthol is incorporated into the rat repellent solution, as it is known to effectively result in overstimulation of the olfactory system of the rat. In alternative embodiments, similar esters or oils may be used. For example, camphor oil or other natural extracts of pungent elements may be extracted and added to the rat repellent solution individually or in combination.

A second step of the impregnation involves incorporating the structural member 5 into the rat repellent solution. The structural member 5 is submerged within the rat repellent solution. The rat repellent solution is contained with a container in a predetermined volume, effective to cover or submerge the structural member 5 by an amount approximately equal to half the volume of the structural member 5.

In an embodiment, the structural member 5 is forced within the rat repellent solution. Where the structural member 5 is buoyant within the solution, a weight, or retention device is deployed to maintain the position of the structural member 5 within the rat repellent solution.

In some embodiment, a next step requires a negative pressure to be applied to the container interior. A lid is placed on the container to seal the interior allowing for the pressure within the container to be manipulated. In one embodiment, the lid of the container is disposed with one or more connection mechanisms, each adapted to receive one or more tubes. At least one of the tubes is connected to a pump; whereby the pump is configured draw a vacuum against the pressure within the container. One or more valves may be disposed within the tubing system or at the connection mechanisms to allow for selective manipulation of the flow of air into, and/or out of the interior of the container and connection to the atmosphere.

The alteration of the pressure is sufficient to expand the air within the pores and voids between fibrous tissues of the structural member 5. The expanded air leaves the structural member 5 as bubbles that surface on the rat repellent solution.

In an embodiment, the structural member 5 remains within the container and submerged in the solution for an amount of time until the outflow of air bubbles from the structural member 5 slows. Such time may be defined by a visual inspection of the structural member 5 as indicated by a plurality of bubbles representing the release of air caused by the reduced atmospheric pressure within the structural member 5.

In an alternative embodiment, the structural member 5 contacts the rat repellent solution on an exterior surface of the structural member 5. As the rate of air bubbles escaping the structure slows suitably the pump is stopped. The atmosphere valve is opened and the negative pressure is replaced by atmospheric pressure on the top of the solution. The evacuated air from the pores and voids of the structural member 5 is replaced by the rat repellant solution forced into the structural member 5 by atmospheric pressure.

After the structural member 5 has become sufficiently impregnated and saturated with the repellent solution, the impregnated structural member 5 is positioned at a predetermined location for packaging.

Method of Deployment

In some embodiments, the structural member 5 is a single piece of material with a substantially sharp or pointed member configured to pierce a substrate 10, such as the ground. In such an embodiment, the structural member 5 is a stake and is inserted into a predetermined location, which is exterior to a structure that a user requires rat prevention.

In some embodiments, as shown in FIG. 3, for example, the structural member 5 is secured by a clamp 15 having at least two spring biased arm members 20. Each of the arm members 20 is spring biased towards one another. In such an embodiment, the arm members 20 may be disposed on opposite sides of the structural member 5 such that the arm members 20 are biased towards each other with the structural member 5 separating the arm members 20.

In some embodiments, the spring biased arm members 20 are configured to positively engage a separate structure. For example, the separate structure is a joist or beam of a house or building. In such an embodiment, the arm members 20 are separated using sufficient force to separate the arm members 20 away from one another to a distance greater to a width of the substrate 10, the structural member 5 is then positioned such that the substrate 10 is between each of the arm members 20. The arm members 20 are then released and clamp the substrate 10 between the arm members 20. For example, the clamp 15 may be a hand clamp.

In another embodiment, a thin adhesive film (not shown) could be utilized as supplementary or alternative means of affixation of the invention to a structural member 5 such as a stud or floor joist, or other items.

In a specific example, the substrate 10 is a shipping pallet. The shipping pallet has a plurality of slats forming a frame. The slats have a width and the arm members 20 are configured to open at least the width of the slat whereby the arm members 20 are released to engage the slat member and structural member 5.

In an alternative embodiment, as shown in FIGS. 1-2, for example, the structural member 5 has one or more apertures 25 extending through the structural member 5. The apertures 25 are configured to receive a fastener 30 or attachment means. For example, an aperture 25 is sufficiently open to accept a screw to penetrate the aperture 25 and affix the structural member 5 to a substrate 10 such as a wall or shipping pallet cross-member.

In an embodiment, once the system is deployed, the menthol is distributed throughout a range of surrounding area. The distribution of the menthol provides for a constant presence of the menthol, and thereby a constant state of over stimulation for a rat within the surrounding area of the structural member 5.

In an alternative embodiment, the structural member 5 has one or more apertures 25 extending through the structural member 5. The apertures 25 are configured to receive a fastener 30 or attachment means. For example, an aperture 25 is sufficiently open to accept a screw to penetrate the aperture 25 and affix the structural member 5 to a substrate 10 such as a wall or shipping pallet slat. In an embodiment, the aperture 25 can be of different sizes and shapes to utilize various screws, nails, gang nails and gang screws attachment means 30.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In view of the foregoing disadvantages inherent in the known types of rat control systems now present in the prior art, the present invention provides a new rat repellent system construction wherein the same can be utilized for repelling rats from open areas while simultaneously providing a pleasant scent.

To attain this, the present invention generally comprises a wooden stake soaked in a fragrant combination of oils. A package stores one or more of the stakes within a sealable plastic bag. The user removes a single post and drives the stake into the ground in the area intended to be protected from rats. The fragrance oil permeates the wooden stake and is slowly released to the surrounding atmosphere. The fragrance oil provides a strong scent that repels rats by irritating their olfactory system while simultaneously providing a pleasant scent to most humans.

In an embodiment, a primary object of the present invention is to provide a rat repellent system that will overcome the shortcomings of the prior art devices.

In an embodiment, another object is to provide a rat repellent system that effectively repels rats from open areas.

In an embodiment, an additional object is to provide a rat repellent system that is pleasant smelling to most individuals.

In an embodiment, a further object is to provide a rat repellent system that is an olfactory irritant to rats.

In an embodiment, another object is to provide a rat repellent system that has an EPA minimum risk classification to humans.

In an embodiment, an additional object is to provide a rat repellent system that does not harm rats or humans.

In an embodiment, a further object is to provide a rat repellent system that is easily placed in an open area.

In an embodiment, another object is to provide a rat repellent system that is comprised of natural substances.

In an embodiment, other objects and advantages of the present invention will become obvious to the reader and it is intended that these objects and advantages are within the scope of the present invention.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A rat repellent system comprising:
   a menthol solution;
   a structural member saturated with the menthol solution, the structural member having an aperture extending therethrough; and
   a fastener,
   wherein the aperture is configured to receive the fastener,
   wherein the fastener is configured to couple the structural member to a substrate,
   wherein the substrate is selected from the group consisting of a wall stud, a floor joist, a structural beam, and a shipping pallet.

2. The system of claim 1, wherein the menthol solution is prepared at a temperature of at least 85 degrees Fahrenheit.

3. The system of claim 1, wherein a process of saturating the structural member comprises:
   submerging the structural member into the menthol solution, wherein the structural member absorbs the menthol solution.

4. The system of claim 3, wherein the process of saturating the structural member further comprises:
   pressurizing the submerged structural member, wherein pressurization is configured to expand fibers of the structural member.

5. The system of claim 1, wherein the fastener is selected from the group consisting of a screw, a bolt, and a nail.

6. A rat repellent system comprising:
   a menthol solution;
   a structural member saturated with the menthol solution; and
   a clamp configured to releasably couple the structural member to a substrate,
   wherein the substrate is selected from the group consisting of a wall stud, a floor joist, a structural beam, and a shipping pallet.

7. The system of claim 6, wherein the menthol solution is prepared at a temperature of at least 85 degrees Fahrenheit.

8. The system of claim 6, wherein a process of saturating the structural member comprises:
   submerging the structural member into the menthol solution, wherein the structural member absorbs the menthol solution.

9. The system of claim 8, wherein the process of saturating the structural member further comprises:
   pressurizing the submerged structural member, wherein pressurization is configured to expand fibers of the structural member.

* * * * *